(12) United States Patent
McRae et al.

(10) Patent No.: US 6,754,501 B1
(45) Date of Patent: Jun. 22, 2004

(54) MEDIA ACCESS ADAPTIVE CONTROL TO IMPROVE SYSTEM THROUGHPUT

(75) Inventors: Denis M. McRae, Cary, IL (US); Walter F. Lundby, Wheaton, IL (US); Oleg A. Panfilov, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 486 days.

(21) Appl. No.: 09/705,003

(22) Filed: Nov. 2, 2000

(51) Int. Cl.$^7$ ............................................. H04Q 7/20
(52) U.S. Cl. ...................... 455/453; 370/229; 370/348
(58) Field of Search ................................. 455/444, 442, 455/437, 427, 436, 453, 455, 424; 370/229, 233, 328, 443, 232, 234, 235, 348, 332

(56) References Cited

U.S. PATENT DOCUMENTS

| | | | | |
|---|---|---|---|---|
| 4,757,460 A | * | 7/1988 | Bione et al. | 709/248 |
| 5,353,287 A | * | 10/1994 | Kuddes et al. | 370/448 |
| 5,361,063 A | * | 11/1994 | Jaffe et al. | 340/825.5 |
| 5,369,639 A | * | 11/1994 | Kamerman et al. | 370/347 |
| 5,623,535 A | * | 4/1997 | Leung et al. | 455/444 |
| 5,696,760 A | * | 12/1997 | Hardin et al. | 370/252 |
| 5,724,588 A | | 3/1998 | Hill et al. | |
| 5,774,479 A | * | 6/1998 | Lee et al. | 714/749 |
| 5,828,663 A | * | 10/1998 | Ikegami | 370/347 |
| 5,912,878 A | | 6/1999 | Park et al. | |
| 6,112,089 A | * | 8/2000 | Satarasinghe | 455/437 |
| 6,115,390 A | * | 9/2000 | Chuah | 370/443 |
| 6,118,997 A | * | 9/2000 | Kim et al. | 455/424 |
| 6,192,246 B1 | * | 2/2001 | Satarasinghe | 455/442 |
| 6,226,277 B1 | * | 5/2001 | Chuah | 370/328 |
| 6,377,548 B1 | * | 4/2002 | Chuah | 370/233 |

\* cited by examiner

*Primary Examiner*—Charles Appiah
(74) *Attorney, Agent, or Firm*—Lalita W. Pace

(57) ABSTRACT

In a cellular communications system (10) in which a plurality of mobile subscriber units (100) attempt to access at least one BTS (140), which is controlled by a controller (150), a method of controlling system congestion is provided. The subscriber units (100) record a number of failed access attempt transmissions (210). The failed attempt data (122, 124) is transmitted (220) to the BTS (140) in subsequent access messages (120). From the failed attempt data (122, 124), the controller (150) generates an array of access restriction values (172), which are transmitted to the subscriber units (100) within the Access Parameters Message (170). The access restriction values (172) are used by the subscriber units (100) to perform one or more persistence tests (240, 245, 250). The access restriction values (172) control the probability of the persistence tests (240, 245, 250) passing for any given access slot. The present method provides dynamic control of system load, allowing for a higher percentage of successful call attempts when the system (10) is experiencing a heavy load.

6 Claims, 3 Drawing Sheets

MEDIA ACCESS ADAPTIVE CONTROL TO IMPROVE SYSTEM THROUGHPUT

FIELD OF THE INVENTION

The present invention relates to communications systems and, more particularly, to a method for adaptive control of access to a wireless telecommunication system.

BACKGROUND OF THE INVENTION

In cellular communication systems, such as a code division multiple access (CDMA) communication system, a subscriber unit or mobile station and a fixed network unit or base station establish a two-way communication link through forward and reverse radio frequency (RF) communication links. The forward communication links originate from the base station and the reverse communication links from the mobile station. The base station normally communicates simultaneously to a number of mobile stations. An example of such a system is described in the Telecommunications Industry Association/Electronic Industry Association Standard 95B (TIA/EIA/IS-95-B).

When too many subscribers access a system at the same time, the system enters a degraded state. The degradation affects both the subscriber and the system. System degradation is due to collisions on the control channel. FIG. 1 is a plot of access channel throughput versus offered traffic measured through the number of access attempts per slot time for an exemplary cellular telecommunication system. As shown in FIG. 1, the system throughput steadily increases up to an ideal point at an offered traffic rate of 1.0. Beyond this point, system degradation is evident.

In conventional systems, the media access controller or base station controller broadcasts an access restriction value to the subscriber units on a paging channel in an attempt to keep the system operating on the left side of the throughput curve. The access restriction value is used by each subscriber unit to calculate when to initiate another access attempt. Unfortunately, in conventional systems, the media access controller cannot determine on which side of the throughput curve the subscriber unit is functioning. This is partially due to the fact that in conventional cellular telecommunication systems, it is impossible to determine how many attempts a subscriber made before successfully initiating an access. Therefore, the media access controller indiscriminately broadcasts access restriction values based on a static database configuration in order to cut off excess traffic.

Accordingly, it has been considered desirable to develop a new and improved method and apparatus for adaptively controlling access to a shared media that meets the above-stated needs and overcomes the foregoing difficulties and others, while providing better and more advantageous results.

For instance, one advantage of the present invention is that it provides a more robust system with better throughput.

Another advantage of the present invention is the provision of a cellular communications system which accommodates geographic loading differences.

Yet another advantage of the present invention is that more call attempts will succeed when the system is experiencing a heavy load.

Still another advantage of the present invention is the provision of a dynamic assignment of access restriction values based on actual load instead of a static database configuration.

A further advantage of the present invention is that it selectively reduces less important traffic components, better accommodating all classes of subscriber during emergency situations.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 2:
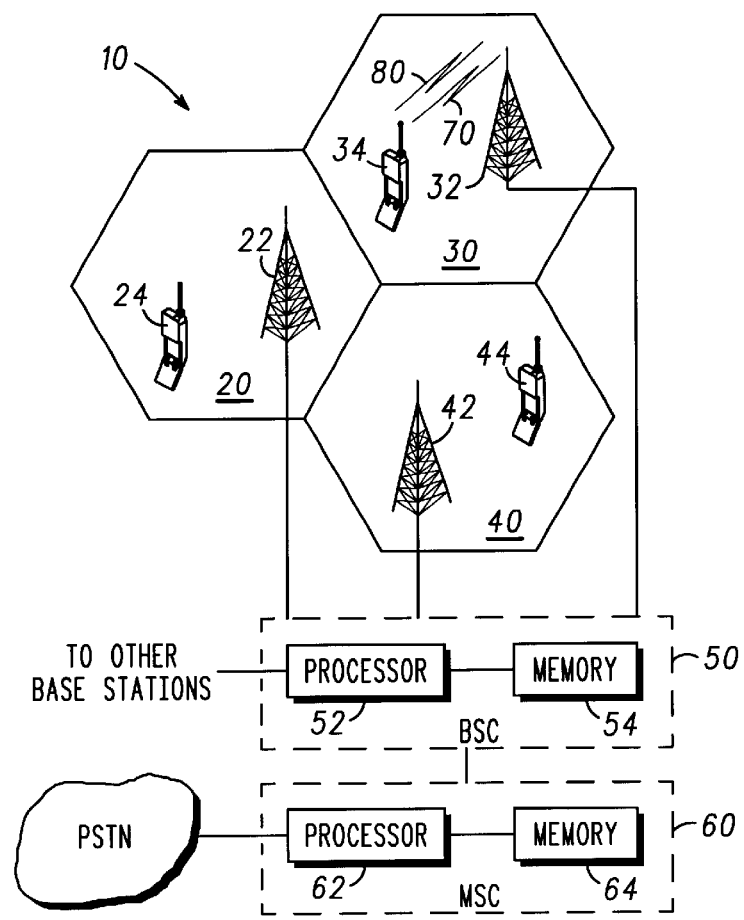
FIG. 2 is a diagrammatic illustration of a wireless communication system according to a preferred embodiment of the present invention.

With reference to FIG. 2, a wireless communication system 10, such as a direct sequence code division multiple access (DS-CDMA) digital radiotelephone system is provided. Base transceiver stations (BTSs) 22, 32, 42 may communicate with mobile device 24, operating within coverage area 20, served by BTS 22. Similarly, BTSs 22, 32, 42 may communicate with a mobile device 34 operating within coverage area 30, served by BTS 32. BTSs have fixed locations, such locations chosen to provide overlapping coverage areas. BTSs 22, 32, 42 are coupled to a media access controller, such as a base station controller (BSC) 50, which includes, among other things, a processor 52 and a memory 54. The BSC 50 is, in turn, coupled to a mobile switching center (MSC) 60, also including, among other things, a processor 62 and a memory 64. The BSC and MSC operate according to well-known methods and are commercially available from Motorola, Inc. While the present invention is being described with respect to a wireless communication system, it is to be appreciated that it is applicable to any system in which a plurality of subscriber units compete for access to a shared media, such as an internet-based and/or ethernet-based system.

Multiple access wireless communication between BTS's 22, 32, 42 and mobile devices 24, 34, 44 occurs via radio frequency (RF) channels over which digital communication signals such as voice, data, and video are transmitted. Base-to-mobile device communications are said to occur on a forward-link channel 70, while mobile-to-base communications are referred to as being on a reverse-link channel 80. A communication system using CDMA channelization is described in detail in EIA/TIA Standard IS95-B.

As shown in FIG. 2, a communication signal 70 is transmitted on an IS-95B forward-link channel, such as a paging channel or traffic channel from a BTS, such as BTS 32 to mobile device 34. Alternately, a communication signal 80 may be transmitted via an IS-95B reverse-link channel, such as an access channel or a traffic channel, by mobile device 34 to its source BTS 32. Similarly, other mobile devices may receive and/or transmit communication signals with other base transceiver stations.

Figure 3:
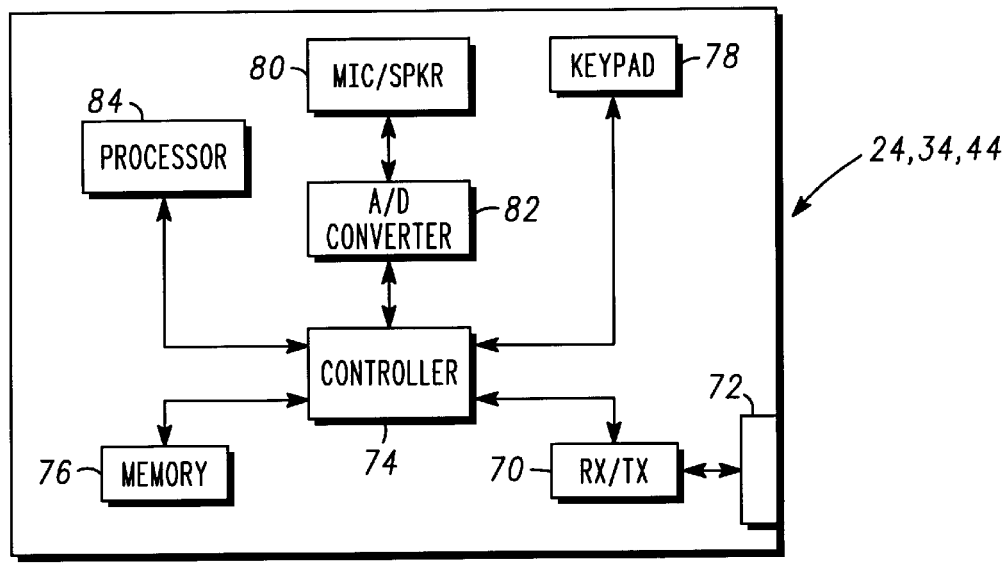
FIG. 3 is a simplified block diagram of an exemplary wireless device that incorporates the features of the present invention therein.

With reference now to FIG. 3, there is shown a simplified block diagram of an exemplary mobile subscriber unit or wireless device 24, 34, 44. The wireless device 24, 34, 44 can be a telephone, a cable telephony interface device, a cellular or PCS radiotelephone, a cordless radiotelephone, a radio, a personal digital assistant (PDA), a pager, a palm-top computer, a personal computer, etc. Accordingly, as used herein, wireless device refers to each of these devices and their equivalents.

The device 24, 34, 44 includes a transceiver 70, transceiver antenna 72, microprocessor-based controller 74, memory 76, keypad 78, transducers 80 (e.g. microphone, speaker), an analog-to-digital converter 82, and a processor 84. The wireless device 24, 34, 44 is adapted to communicate (i.e. transmit and receive communication signals such as data and voice) over a public switched telephone network (PSTN) via a cellular radiotelephone system, such as a CDMA cellular radiotelephone system, global system for mobile communication (GSM) cellular radiotelephone system, etc.

Figure 4:
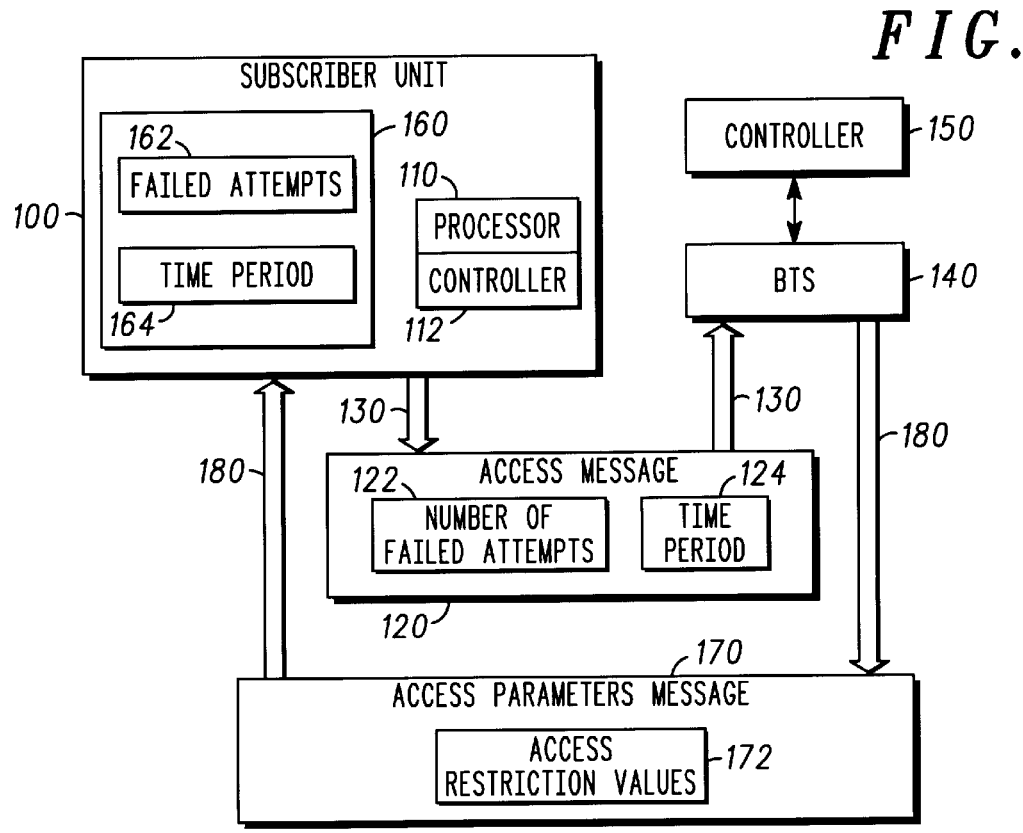
FIG. 4 is a buffer diagram which illustrates the congestion control method of the present invention.

With reference now to FIG. 4, there is shown a second simplified block diagram of an exemplary subscriber unit or wireless device 100. The subscriber unit 100 can be a telephone, a cable telephony interface device, a cellular or PCS radiotelephone, a cordless radiotelephone, a radio, a personal digital assistant (PDA), a pager, a palm-top computer, etc. Accordingly, as used herein, subscriber unit or wireless device refers to each of these devices and their equivalents.

Figure 1:
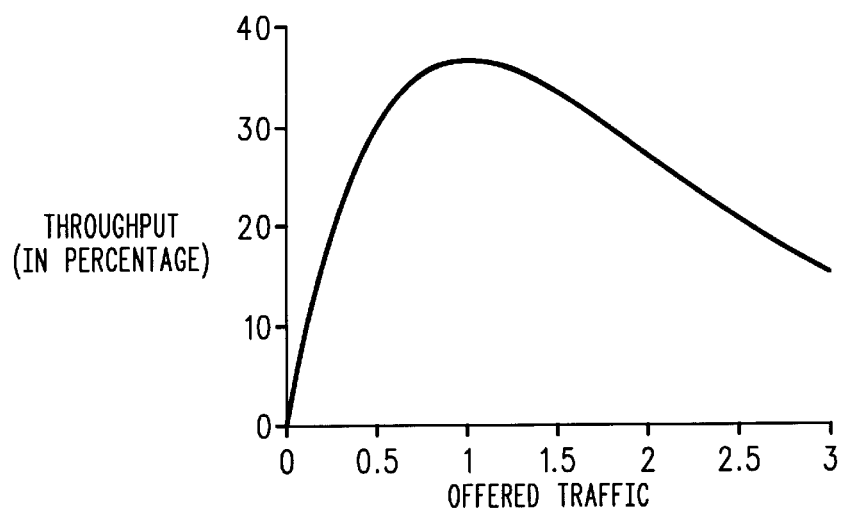
FIG. 1 is a plot of access channel throughput versus offered traffic measured through the number of access attempts per slot time for an exemplary wireless communication system.

In one embodiment of the present invention, the subscriber unit 100, which includes a processor 110 and a controller 112, periodically transmits an access message 120 on an Access Channel 130 to a base transceiver station (BTS) 140, which is controlled by a controller 150. Access messages may include unsolicited registrations, data burst messages, mobile originations, and the like. Because of the sporadic nature of cellular traffic, access attempts often fail because there are a greater number of access attempts than available time slots (FIG. 1). In the case of a failed access attempt, the subscriber unit 100 keeps a count of failed access attempts over a given period of time. This data is stored in a subscriber unit memory 160, which consists of a failed attempts memory 162 and a time period memory 164. It is to be appreciated that access attempts consist of probe sequences executed by the subscriber unit 100 before successfully accessing the CDMA cellular system. One skilled in the art will appreciate that CDMA systems allow a mobile subscriber unit up to sixteen probe sequences before aborting its attempt to access.

In one preferred embodiment, the access message 120 from the subscriber unit 100 contains two new data fields, namely, a number of failed attempts data field 122 and a time period data field 124. In another embodiment, the subscriber unit 100 calculates a sliding average of failed access attempts per unit time and transmits this field to the BTS 140. It is to be appreciated that the failed attempts data field 122 and the time period data field 124 may be optional within the Access Message, allowing pre-existing subscriber units to co-exist with subscriber units employing the present invention. In other words, the functionality of the present invention is not lost in an environment in which legacy subscriber equipment co-exists with a statistically sufficient population of subscriber equipment employing the present invention.

The system congestion data 122, 124, i.e. the failed attempts per unit time, is passed to the access controller 150 for processing. From this data, the controller 150 generates an array of access restriction values. In one embodiment, the controller computes a sliding average of failed access attempts per unit time and uses the sliding average as an index into a lookup table of access restriction values. In another embodiment, the controller calculates an array of access restriction values from the transmitted system congestion data 122, 124. In a preferred CDMA system, the access restriction values consist of an array of PSIST or persistence values. As is discussed more fully below, PSIST values are broadcast to and used by the subscriber units within a given coverage area in the calculation of persistence delay values. Those skilled in the art will appreciate that different PSIST values may be transmitted for different mobile overload classes. In other words, different PSIST values are broadcast to be used for different traffic components based on the observed number of access probe sequences before the access channel request is satisfied.

Once the controller 150 generates the access restriction values, an Access Parameters Message 170 is broadcast on a Paging Channel 180 to all subscriber units within a given coverage area. Artisans will appreciate that the Access Parameters Message 170 defines the parameters used by the subscriber units transmitting to the BTS 140 along the Access Channel 180. Within the Access Parameters Message 170 is an access restriction values field 172, which contains the array of access restriction values calculated by the controller 150.

Figure 5:
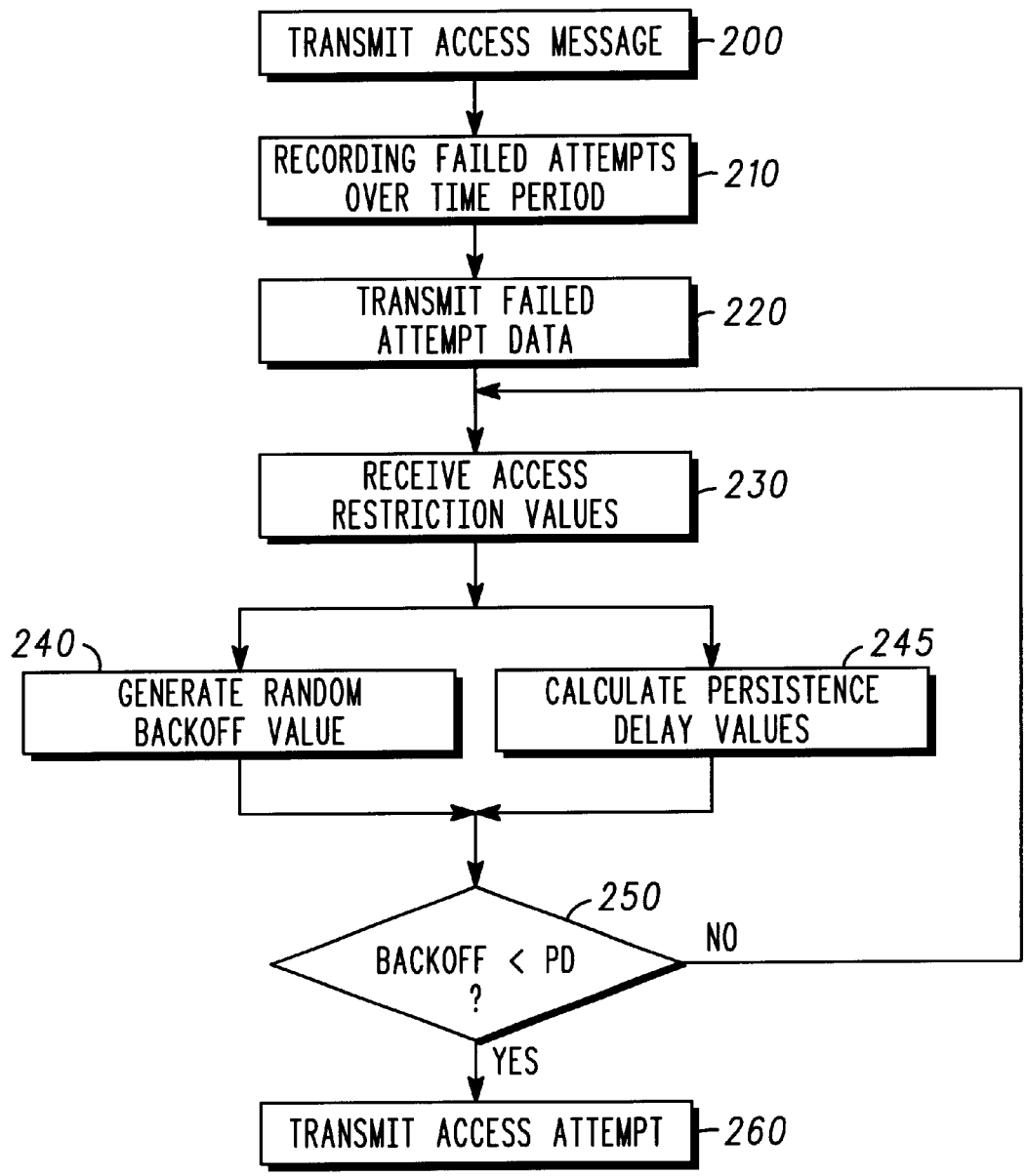
FIG. 5 is a flow chart which illustrates a method of accessing a base transceiver station in accordance with the present invention.

With reference now to FIG. 5 and continued reference to FIG. 4, a method for accessing a BTS is provided. In one embodiment, a subscriber unit 100 transmits an access message 120 to the BTS 140 (step 200). During the access process, i.e. the executing of one or more probe sequences, the subscriber unit 100 records the number of failed access attempts (step 210) over a given period of time before successful access to the system. At step 220, the subscriber unit transmits the failed attempt data to the BTS. In one embodiment, the failed attempt data is transmitted within the access message. In an alternate embodiment, the failed attempt data is transmitted to the BTS in a separate message.

As is discussed above, the controller 150 receives the failed access attempt data and calculates an array of access restriction values that are broadcast continuously to all subscriber units within the given coverage area. These access restriction values are received (step 230) by the subscriber unit. The access restriction values are used by the subscriber unit to perform one or more persistence tests (step 250). More particularly, the subscriber unit generates a persistence delay (PD) value (step 245) using the access restriction values.

In a preferred embodiment, the subscriber unit receives an array of PSIST values, such as those provided in Table 1, which are used to compute the PD value in a conventional manner. In addition, the subscriber unit generates a pseudo-random backoff value (step 240) in a conventional manner. The PD value (step 245) and backoff value (step 240) are used to perform the persistence test at step 250. More particularly, the calculated persistence delay value is compared to the backoff value. If the PD value is less that the backoff value, the persistence test (step 250) fails. If the persistence test fails, the subscriber unit waits until the next access slot and performs another persistence test. Persistence tests are performed until the test is passed. If the PD value is less that the backoff value, the persistence test passes and the subscriber unit transmits an access message (step 260) to the BTS at relatively low power. As illustrated in Table 1, it is to be appreciated that the access restriction values that the subscriber unit receives from the controller controls the probability of the persistence test passing for any given access slot.

TABLE 1

Exemplary PSIST Acess Restrictin Values in a CDMA System

| | Probe Sequence # | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| PSIST Value | 0 | 4 | 8 | 12 | 16 | 20 | 24 | 28 | 32 | 36 | 40 | 44 | 48 | 52 | 63 |
| Reduction in Traffic | 1 | 2 | 4 | 8 | 16 | 32 | 64 | 128 | 256 | 512 | 1k | 2k | 4k | 8k | 4 |

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. In a wireless communication device, a method for accessing a transceiving station controlled by a controller, said method comprising:

transmitting a first access message to the transceiving station;

recording a number of failed transmission attempts within a period of time;

transmitting to the transceiving station the recorded number of failed transmission attempts within a period of time receiving an array of access restriction values from the transceiving station;

performing at least one persistence test using the received access restriction values, wherein performing at least one persistence test includes generating a random backoff value, said backoff value being between zero and one; calculating a persistence delay value for subsequent attempted access messages; and comparing the random backoff value and the persistence delay value; and in response to the step of performing a persistence test, one of (i) transmitting a second access message, and (ii) waiting a persistence delay and then performing an additional persistence test.

2. The method according to claim 1, wherein when the persistence value is greater than the random backoff value, the method transmits the second access message.

3. The method according to claim 1, wherein the recorded number of failed access attempts are transmitted with each access message.

4. A mobile wireless communication device comprising:

means for performing an access attempt to a base station, said base station being controlled by a media access controller;

means for counting a number of failed access attempts;

means for recording a time period over which the failed access attempts are counted;

means for transmitting an access message to the base station, said access message including (i) the number of failed access attempts, and (ii) the time period over which the failed access attempts were counted;

means for receiving an access restriction value from the media access controller; and a processor for performing at least one persistence test using the received access restriction values, wherein performing at least one persistence test includes generating a random backoff value, said backoff value being between zero and one; calculating a persistence delay value for subsequent attempted access messages; and comparing the random backoff value and the persistence delay value; and wherein in response to performing a persistence test, the processor one of (i) transmits a second access message, and (ii) waits a persistence delay and then performs an additional persistence test.

5. The mobile wireless communication device according to claim 4, wherein the received access restriction value is computed by the media access controller in response to the transmitted access message.

6. The mobile wireless communication device according to claim 4, wherein the calculated persistence delay factor determines a time delay between successive access attempts.

* * * * *